Dec. 15, 1936.  G. W. PIERCE  2,063,944
DIRECTION, TRANSMISSION, AND RECEPTION METHOD AND SYSTEM
Filed Feb. 9, 1932  4 Sheets-Sheet 1
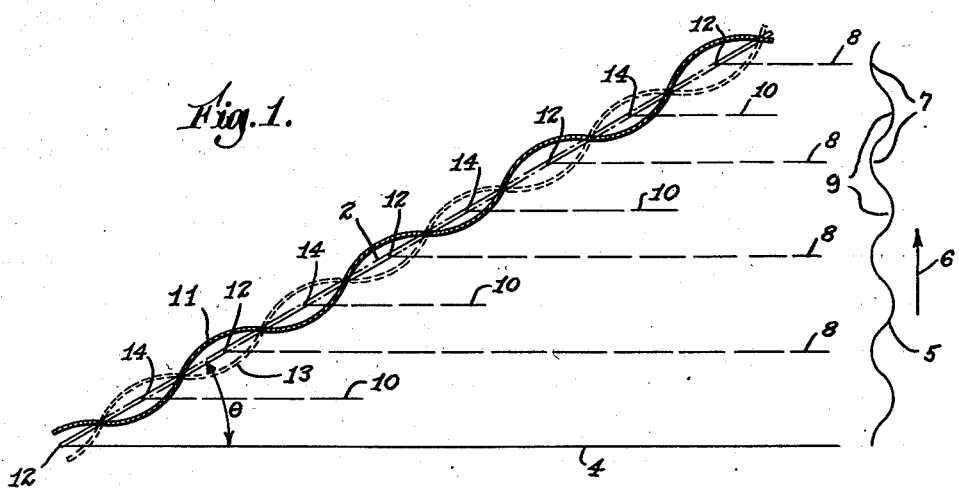
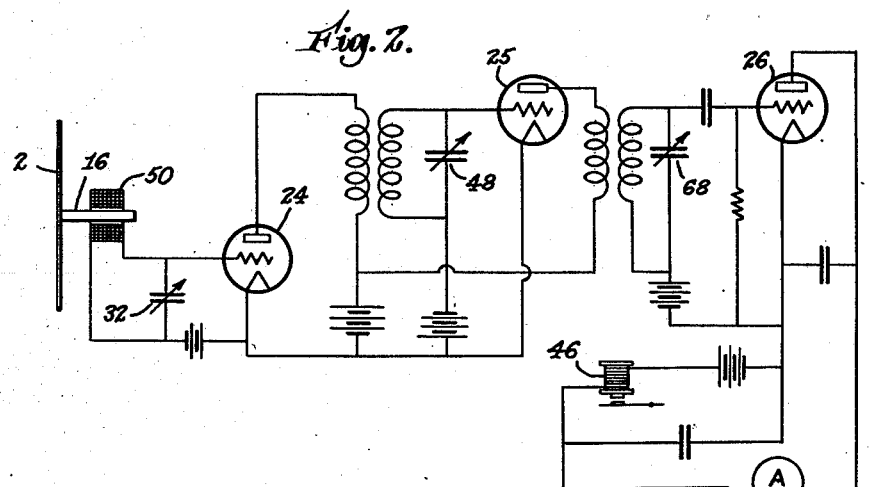
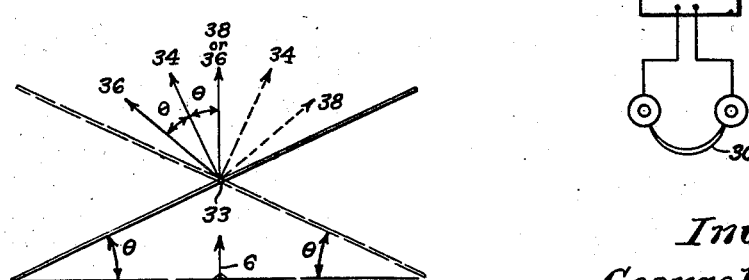
Inventor
George W. Pierce
by David Rines
Attorney

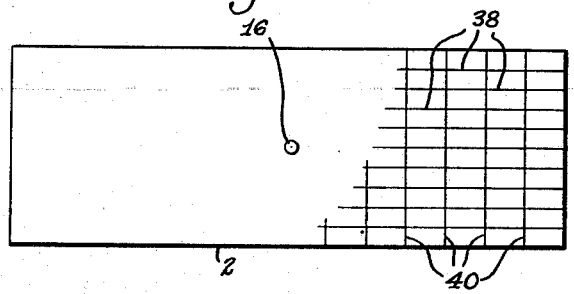
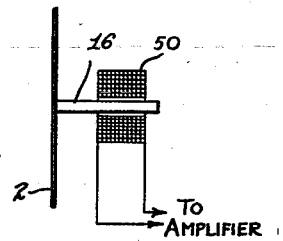
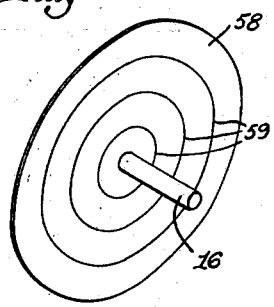
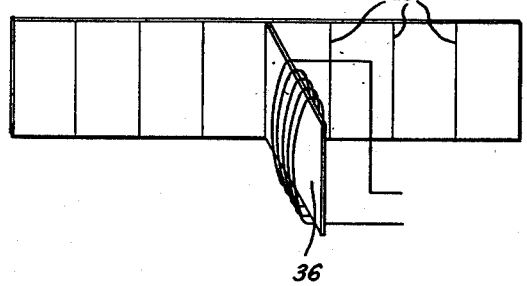
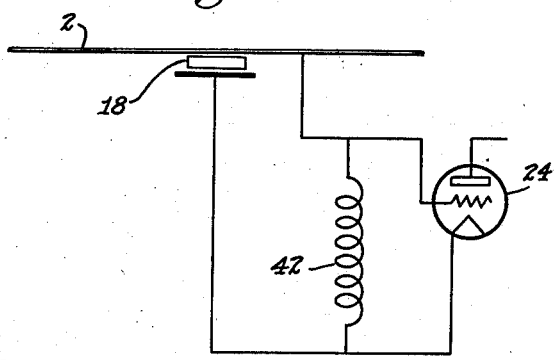
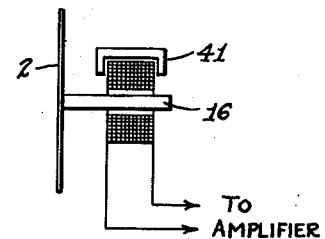

Dec. 15, 1936.  G. W. PIERCE  2,063,944
DIRECTION, TRANSMISSION, AND RECEPTION METHOD AND SYSTEM
Filed Feb. 9, 1932  4 Sheets—Sheet 3
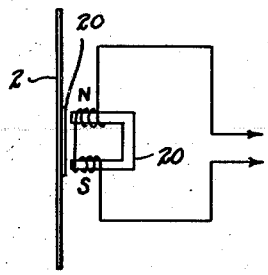
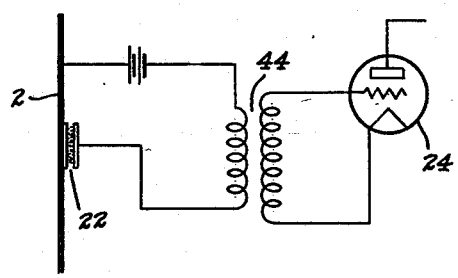
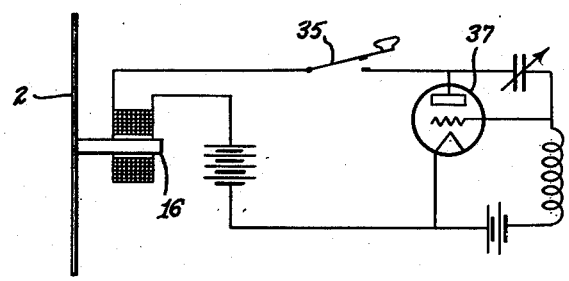
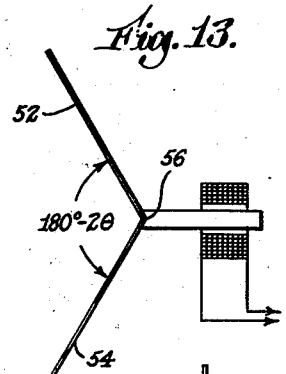
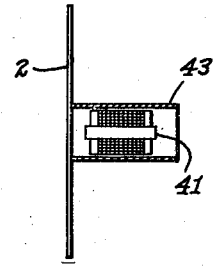
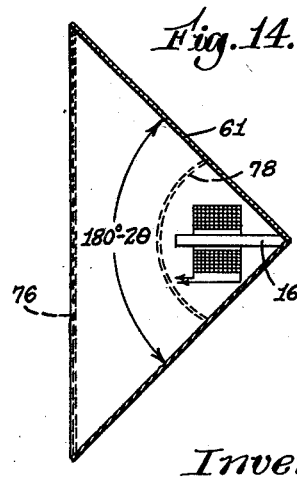
*Inventor*
*George W. Pierce*
*by David Rines*
*Attorney*

Dec. 15, 1936.   G. W. PIERCE   2,063,944
DIRECTION, TRANSMISSION, AND RECEPTION METHOD AND SYSTEM
Filed Feb. 9, 1932   4 Sheets-Sheet 4
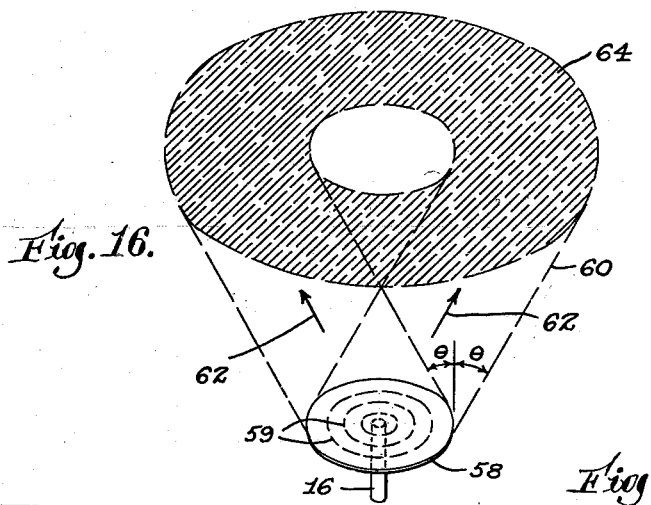
Fig. 16.
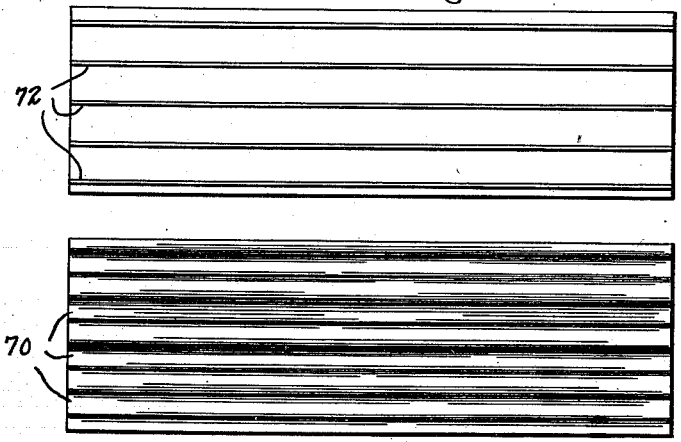
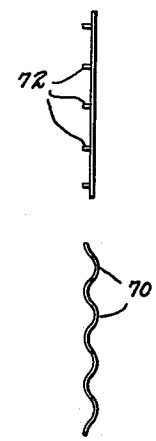
Fig. 18.
Fig. 19.
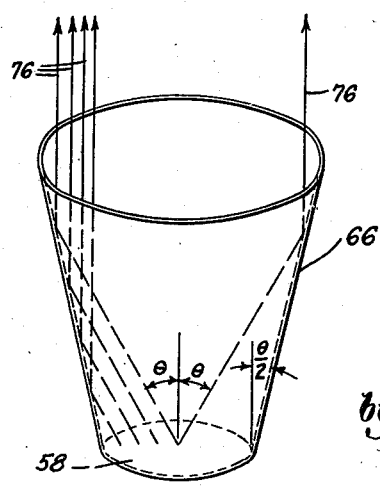
Fig. 17.
Inventor
George W. Pierce
by David Rines
Attorney Patented Dec. 15, 1936

2,063,944

UNITED STATES PATENT OFFICE 2,063,944

DIRECTION, TRANSMISSION, AND RECEPTION METHOD AND SYSTEM

George W. Pierce, Cambridge, Mass.

Application February 9, 1932, Serial No. 591,838

27 Claims. (Cl. 181—26)

The present invention relates to the transmission and reception of intelligence, using sound waves as the agency of communication, and more particularly to methods of and means for directively discriminating a sound beam. The term "sound" will be employed hereinafter, in the specification and the claims, to include the supersonic, as well as the audible, part of the sound spectrum, and to include also all kinds of elastic vibrations. The invention, indeed, finds particular application to supersonic communication.

An object of the invention is to provide a new and improved vibrator.

Another object is to provide a new and improved diaphragm.

A further object is to provide a new and improved method and system of communication.

Still another object is to provide a new direction finder.

Another object is to provide a new and improved system for directively discriminating a sound beam.

Other and further objects will be explained hereinafter, and will be particularly pointed out in the appended claims.

With the above ends in view, a feature of the present invention resides in a method of directively discriminating a sound beam comprising cumulatively interacting between said sound beam and a diaphragm which is mechanically coupled to the sound-conducting medium, wherein a transverse vibration is propagated along the diaphragm with a velocity having a component in the direction of propagation of the sound beam equal to the velocity of said sound beam.

In the use of this method, for reception, the diaphragm is advantageously disposed at such an angle to the sound beam that the latter itself produces said transverse vibrations along the diaphragm. In the case of transmission, the sound beam may be produced by exciting the diaphragm into transverse vibrations which travel along the diaphragm with a velocity having a component, in the predetermined direction of the sound beam, equal to the velocity of propagation of the beam in its medium.

In a preferred embodiment of the invention, the superaudible components of the sound beam are in cumulative interaction with the transverse vibrations of the diaphragm.

The invention will now be explained in connection with the accompanying drawings, in which Fig. 1 is a diagrammatic view illustrating a principle underlying the invention; Fig. 2 is a diagrammatic view of apparatus and circuits for a receiving installation arranged and constructed according to a preferred embodiment of the invention; Fig. 3 is a further diagrammatic view, illustrating a feature of the invention; Fig. 4 is a front elevation of one form of transmitting or receiving diaphragm according to the present invention; Fig. 5 is a side elevation of the same, a coil being shown in section; Figs. 6 and 7 are views illustrating modified diaphragms; Figs. 8 to 11, inclusive, are diagrammatic views of receiving circuits embodying the present invention; Fig. 12 is a diagrammatic view of a transmitter, in accordance with the present invention; Fig. 13 is a diagrammatic view of a dihedral-angle diaphragm embodying the present invention; Fig. 14 is a similar view illustrating a cone diaphragm; Fig. 15 is a similar view illustrating a hollow, cylindrical core for driving the diaphragm of the present invention; Fig. 16 is a similar view, illustrating a cone of sound radiating from a circular-disk diaphragm; Fig. 17 is a similar view illustrating a truncated, conical reflector for the cone of sound illustrated in Fig. 16; and Figs. 18 and 19 are views of modified diaphragms having stiffening means.

Referring first to Fig. 1, let the straight line 2 represent a continuous diaphragm in the form, say, of a plate, disposed in communication with a sound-conducting medium, such as air, or the ocean, for the purpose of propagating therein, or receiving therefrom, signal sound (including supersonic) waves. Acoustic energy is thus interchanged between the medium and the diaphragm. The sound beam has high-pressure points, and low-pressure points. The position of the high-pressure and low-pressure points will, of course, depend on the wave length. Neighboring high and low-pressure points will be a half-wave length apart.

The diaphragm may be turned to an angle $\theta$ with a line 4 passing through the lower end of the diaphragm 2 and extending at right angles to the direction of an incoming beam of signal sound waves, traveling in the direction indicated by the arrow 6. The angle $\theta$ is thus the angle between the plane wave front and the plate diaphragm 2 on which the wave front is incident. The sound beam is diagrammatically indicated by the wavy line 5, the high-pressure points being diagrammatically indicated at 7 and the low pressure points at 9, separated from neighboring high-pressure points by half-wave lengths.

At this particular angle $\theta$, the impingement of the sound beam upon the diaphragm 2 will cause a periodic displacement of the parts of the diaphragm, in the manner described as a standing wave. Let the line 4, and the lines 8, parallel to the line 4, represent instantaneously the zones of high pressure, and the similarly parallel lines 10, half way between the lines 8, the zones of low pressure. Neighboring high and low-pressure points will, therefore, be a half-wave length apart, as indicated by neighboring points 7 and 9 of the wave curve 5. Let the lines 4 and 8 intersect the diaphragm 2 at the points 12, and let the lines 10 intersect the diaphragm at the points 14.

The periodic impulses of pressure of the sound wave, therefore, all strike the high-pressure points 12 of the diaphragm in the same phase, say, a push. The rarefied impulses similarly all strike the diaphragm at the low-pressure points 14 in phase, say, a pull. Consequently, they will exert forces upon the diaphragm of such a nature as to tend to bend the diaphragm into an undulating form. The initial impingement of a wave front of the sound beam upon the diaphragm will produce a transverse distortion in the diaphragm which will travel along the diaphragm with a velocity determined by the thickness of the diaphragm and the material of which it is made. If this velocity is greater than the velocity of the sound in the medium it is then possible to turn the diaphragm to such an angle to the incoming beam that the wave front and its corresponding distortion of the diaphragm will travel along the diaphragm in step with each other. Meanwhile, succeeding wave-fronts produce corresponding displacements of the diaphragm, with the net result that a wave of undulation travels along the diaphragm, reinforced as it progresses by the wave fronts which produced it.

This wave of undulation, upon reaching the end of the diaphragm, is reflected upon itself, and a number of such waves, produced by multiple reflection from the ends of the diaphragm, are superimposed on each other. There thus results a standing-wave system, produced by the addition of waves of equal periodicity but opposite direction of propagation. At certain frequencies, all the waves traveling in each direction are in phase, with a resulting enhancement of vibration.

As stated above, this standing-wave system (or for that matter, any component wave of the system) depends for its establishment upon progressive reinforcement between the wave fronts of the sound in the medium, traveling with a velocity $V_0$, and the transverse vibrations of the diaphragm traveling along the diaphragm with a velocity $V$. Only at the angle $\theta$ shown in Fig. 1 can this reinforcement occur. At any other angle, the incoming wave-fronts get out of step with their resulting distortions of the diaphragm, and no reinforcement occurs. Thus, the diaphragm is sharply selective directionally, vibrating strongly in response to sounds from the direction 6, and weakly or not at all to sounds from other directions. The plate diaphragm 2 will thus vibrate back and forth between the full-line position 11 and the dotted-line position 13 of Fig. 1. Cumulative interaction is, therefore, produced between the vibrations of the segments of the diaphragm 2 and the vibrations of the sound beam. The position of the parts 12 and 14 will, of course, depend on the wave length. With a given, properly designed plate-diaphragm, there is, for each of a large number of selected frequencies, a particular angle $\theta$ of maximum response.

The diaphragm may be connected to a magneto-strictive core 16 associated with a pick-up coil 50 (Fig. 2), or a piezo-electric crystal 18 (Fig. 8), a magnetophone armature 20 (Fig. 10), a microphone 22 (Fig. 11), or any other desired device for obtaining electric current or voltage from mechanical motion or pressure. Since the interconverter is activated by the region of the diaphragm to which it is attached, it is desirable to have the vibration of the whole of this region nearly in phase, otherwise the vibration of the interconverter would be diminished. To attain this result, it is evidently necessary that the interconverter of electromagnetic and mechanical energy shall be cooperative with an area of the diaphragm having a dimension, in the direction of propagation of the said transverse vibrations in the diaphragm, small in comparison with their wavelength. The magnetostrictive-core interconverter, for example, is affixed to one of the small-area segments in which the diaphragm is vibratory. The voltages or currents developed may be fed into an amplifier illustrated in Fig. 2, by way of example, as in two stages, the tubes of which are shown at 24, 25, coupled to a detector 26 and, through an audio amplifier 28, to a loud speaker, telephone or other indicating device 30.

The amplifier 24, 25 is tuned by tuning condensers 32 and 48 to the same frequency as the frequency of the sound-beam signal, or to a desired component of the sound frequency. The phones or loud speaker 30 may be replaced or supplemented by a relay 46, in the output circuit of the detector tube 26. The condenser 32, and further tuning condensers 48 and 68, in a further stage or stages of amplification and in the detector, may be operated as a gang on a common shaft (not shown). Though a tuned transformer coupling is shown between the stages, it may be replaced by a tuned impedance, combined with condensers and proper leaks to prevent blocking, or by other coupling devices, as is well known in the art.

The indicating instrument 30 will have maximum response to the signal if the diaphragm 2 is disposed at the proper angle $\theta$ with the sound beam. The angle $\theta$ will depend upon the frequency of the beam. If the diaphragm be turned away from that angle $\theta$, the pressure impulses will strike the diaphragm with a distribution which is improper to produce resonant reinforcement in the diaphragm. The vibrations of the diaphragm will then be much smaller than at the particular angle $\theta$ that produced cumulative reinforcement, or what might be called resonant interaction between the beam and the diaphragm.

The invention finds many uses; among them, owing to its directive discrimination of sound beams, direction finding. As the diaphragm occupies a given angle corresponding to resonant response to the sound beam, it is possible to determine the direction of the sound beam; and as departure from the angle associated with resonance carries with it non-resonance, it is possible to obtain a very sharp determination of direction.

There are two positions of maximum response of the plate 2, on opposite sides of the normal, as shown in Fig. 3, and each corresponding to an angle $\theta$ between the plate 2 and the wave-front (or between the direction of propagation of the sound and the normal to the plate). Waves from either of the symmetrical directions excite the plate in cumulative resonance. A pointer 34 or other index mechanically coupled to the plate 2 and reading on a suitable angular scale (not shown) may be used to measure the angular position of the plate 2. The direction of the sound source will be the line 6 bisecting the angle between the two positions of the pointer 34 at which maximum response is obtained, as shown in Fig. 3.

If desired, the plate may be equipped with two pointers 36, 38, disposed at the angle $\theta$ to the normal 34 to the plate, on each side of this normal. With such an arrangement, the pointer 38 will lie along the direction of the beam when the plate is in the position shown by the full line, and pointer 36 will indicate the sound direction when the plate is in the other position for maximum response, as indicated by the dotted lines.

It is possible to operate the system at a single frequency of signal, even if such frequency is but one component of a source of noise containing many frequencies. All that is necessary is to tune the before-mentioned amplifier to the required frequency and to turn the diaphragm to the angle of maximum response. The angle of sound arrival with respect to the position of the plate 2, at maximum response, and with respect to the selected frequency of the sound beam, is known from the constants of the instrument, as hereinafter explained more fully.

As the operation is completely reversible, the invention is equally applicable to sending as to receiving. A simple transmitting circuit is illustrated in Fig. 12, with a key 35 for controlling an oscillator 37 for driving the core 16 attached to the diaphragm 2.

The diaphragm, whether for sending or receiving, may be rectangular, as shown in Fig. 4, circular, Fig. 6, or of any other desired shape. One advantage of these multiple periodic diaphragms is that they stabilize the frequency and tend strongly to keep the driving current in synchronism with the vibrator. For rectangular shapes, with a cylindrical core 16, the nodes tend to become disposed in two series of lines at right angles to each other, particularly in sending, as illustrated in Fig. 4 at 38 and 40. It may be advantageous, therefore, to have the magnetostrictive core 16, for example, in the form of a plate 36, Fig. 7. The nodes into which the diaphragm becomes thus divided will then tend to be disposed in parallel lines transversely to the diaphragm, as shown diagrammatically at 38. It is evident, of course, that for best results the magnetostrictive core or other device used to change vibrational into electric energy, or vice versa, should not have a dimension, in the direction of propagation of transverse waves in the diaphragm, greater than one-half wave length. Larger units will experience driving forces of opposite phase simultaneously, and will, therefore, be less effective than a unit which acts on a region of one phase only. Both the flat plate core 36 and the cylindrical core 16 are found, in practice, to give sharp direction discrimination.

A polarizing magnet 41 (Fig. 9) may be employed in connection with the magnetostrictive core 16 or 36, or alternatively the polarizing field may be obtained by passing a direct current through the pick-up coil 50 (Fig. 5). The pick-up coil may be external to the magnetostrictive core 16, as shown in Fig. 5, or the core may be made in the form of a hollow cylinder 43 and the pick-up coil enclosed within it, as in Fig. 15.

If the polarizing field is obtained by means of a permanent magnet, the magnet 41 may be placed outside the magnetostrictive member, as in Fig. 9, or within the cylinder 43, and preferably within the coil also, Fig. 15.

If a piezo-electric crystal 18 is used, it is well to connect it in parallel to a path for direct current, such as a choke coil 42, in the input circuit of the amplifier 24, as illustrated in Fig. 8. A resistor, a tuned circuit, or a transformer, tuned or untuned, may replace the choke. If a microphone 22 (Fig. 11) is used, it should be separated from the input circuit of the amplifier 24 by a high-frequency transformer 44, if it is desired to operate the system at high frequency.

The diaphragm may consist, instead of a single transverse plate 2, of two plates or wings 52 and 54, as of aluminum, rigidly secured together in the form of a dihedral angle 180 degrees minus $2\theta$, as illustrated in Fig. 13, so as to provide a single, forward-directed, multi-diaphragm, driven by, or driving, a single, magnetostrictive or other core. A thin, aluminum-plate, dihedral diaphragm of this character, for example, may be designed for 60 kilocycles, and thicker dihedral diaphragms, with different angles $\theta$, for 54 and 30 kilocycles, etc. In order to adapt a given pair of wings 52, 54 to various frequencies, the wings 52 and 54 may be made angularly adjustable about the vertex 56.

The diaphragm may be made in the form of a cone 61, Fig. 14. The angle of this cone diaphragm will be 180 degrees minus $2\theta$. The cone may be driven by a magnetostrictive vibrator 16 with its coil either inside or outside the vibrator, or by other driving apparatus; the sound being radiated along the axis of the cone. The cone diaphragm has advantages for under-water work, because it is easier to house by closing, along one or other of the dotted lines, by the straight sheet 76 or the curved sheet 78, leaving air inside.

The diaphragm, whether a plate, cone, or of some other form, may be mounted by affixing it to a rigid support at any of its nodal points. Inasmuch, however, as the nodal points occur at different places for different frequencies, it may sometimes be preferable to mount the diaphragm on rubber or some other cushioning material. If the diaphragm is to be used at one frequency only, it may be advantageous to affix several take-off members at corresponding, properly spaced, points in the standing wave pattern and connect them, either in series or in parallel, to the tuned amplifier. Wires or rods may be used to conduct the sound from multiple take-off points to a single sound-detecting member, as disclosed in a copending application, Serial No. 591,839, filed February 9, 1932. Any other desired device for obtaining electric current or voltage from the mechanical motion or pressure, or vice versa, may be employed.

When a disc diaphragm, such as is illustrated at 58 in Fig. 6, vibrates as a stationary wave system at a frequency higher than its fundamental, it breaks up into nodes and loops, just as the rectangular plate does, except that, in the case of the disc, the nodal lines are concentric circles 59, separated from each other by one half the wave length of the transverse vibration in the metal. Therefore, if a circular-disc diaphragm 58, Fig. 16, be used for transmission, and driven by a vibrator 16 at its center, so as to vibrate in a series of concentric rings 59, the radiated sound will emerge in the form of a cone 60. The directions of propagation are indicated by the arrow 62. As in the case of the rectangular plate, as hereinafter described, $$\sin \theta = \frac{V_0}{V}$$

Now, it is possible to focus this diverging cone of sound into a parallel or converging beam by reflection. All that is necessary, in order to produce a cylindrical, parallel-sided beam, is to enclose the radiating diaphragm by a truncated cone 66 of metal or other sound reflecting material having a proper angle, as shown in Fig. 17, the truncated cone having for its base the disc 58. The rays 76, at a given frequency, radiate out from the reflector 66 and the disc 58.

The same apparatus is, of course, equally applicable to reception. An on-coming wave is reflected to the disc at the correct angle to produce maximum vibration. Inasmuch as the angle $\theta$ is a function of the frequency, such a device will operate best at a single frequency only.

The angle $\theta$ of maximum emission or response depends on the velocity $V_0$ of sound in the medium and the velocity $V$ of propagation of elastic waves in the material of the diaphragm; and satisfies the said equation $$\sin \theta = \frac{V_0}{V}$$

The velocity $V$ of propagation of waves in the material of the diaphragm, if they are transverse vibrations, depends, not only on the material of the diaphragm, but also on its thickness, and on the frequency, and all of these factors should be considered in designing the apparatus.

Considerable analysis of this question has been carried out by me in connection with this application. Mathematical analysis of transverse vibration in a plate yields the approximate equation:

$$f\lambda^2 = bD$$

where
$f$ is the frequency of vibration;
$\lambda$ is the wave length of propagation of the vibration in the plate;
$D$ is the thickness of the plate; and
$b$ is a constant of the material.

Replacing $\lambda$ by $$\frac{V}{f},$$

this equation becomes $$V = \sqrt{fbD}$$

The incidence of, say, a pressure peak of the wave front, on the plate diaphragm 2 at the lowermost point 12 of Fig. 1 will, as before stated, produce a bending of the plate, and this disturbance will be propagated along the plate 2 to the other, or upper, end thereof with a velocity determined by this equation.

For a given plate, $bD$ is a constant, so the velocity of propagation of the wave is approximately proportional to the square root of the frequency. Thus, as the frequency increases, $V$ increases and, since $$\sin \theta = \frac{V_0}{V}$$

the angle $\theta$ decreases with increasing frequency. These mathematical results have been tested and found very nearly exact by the following types of experiment:

I. Since $$b = \frac{V_0^2}{fD \sin^2 \theta}$$

when $\theta$ is adjusted for maximum response, it is possible to set up a plate receiver 2, select a sound wave of definite frequency from a distant source, adjust $\theta$ for maximum response and then, from the above equation, compute $b$. Inasmuch as $b$ is theoretically a constant, to the degree of accuracy of the equations, we should arrive at the same value for $b$ regardless of what frequency $f$ we use, and what plate thickness $D$. The variation in the value of $b$ thus experimentally determined, using a wide range of frequencies and plate thicknesses, is found to be small enough to permit accurate design of apparatus.

II. A second method of determining $b$ for any given material is as follows: A disc 58 (Fig. 6) is set up in a horizontal position, with a magnetostrictive driver 16 affixed to its center. A coil 50 (not shown in Fig. 6, but illustrated in Fig. 2 and other views) is placed around the driver 16, and it is made to vibrate at any chosen frequency by impressing a voltage of that frequency on the coil.

Sand is then sprinkled lightly on the face of the disc 58. At certain definite frequencies, determined by the dimensions of the plate, a standing wave system of vibration will appear. When this occurs, the sand particles lying on the regions of vibration are set into violent motion and driven into regions of no vibration, or nodes. These nodes appear as concentric rings 59 of sand particles, with nearly equal spacing between them.

In any standing wave system, the nodes are separated by a distance of one half wave length, $$\frac{\lambda}{2}$$

Thus, if $f$, the frequency of vibration, $\lambda$, the wave length, or twice the distance between the sand rings 59, and $D$, the thickness of the disc 58, are measured, it is possible to compute the constant $b$ from the formula:

$$b = \frac{f\lambda^2}{D}$$

This has been done for many frequencies $f$ and several discs 58 of different thickness $D$. The value of $b$ so computed is nearly constant and checks very closely with the value found by the first-described method.

The explanation of the phenomenon described in the opening paragraphs of this specification may now be made in mathematical terms.

If the angle $\theta$ is such that $$\sin \theta = \frac{V_0}{V}$$

the transverse vibration in the plate diaphragm 2 produced by the incident sound wave at the lowermost point 12 (Fig. 1) will arrive at the opposite end of the plate 2, or at any intermediate point along the plate, at the same instant that the pressure peak of the incident sound wave which originated it, traveling in the medium with a velocity $V_0$, arrives at the same point. Thus, if the component of the velocity $V$ of propagation of a transverse wave in the plate, taken in the direction of travel of the longitudinal wave in the medium, is equal to the velocity $V_0$ of this wave, the transverse vibration in the plate will be reinforced at all points along the plate by the incident wave in the medium. This is what is meant by the statement that, at this particular angle $\theta$, the vibrations of the plate 2 are in resonance with the vibrations in the sound beam in the medium.

Plate diaphragms respond pretty well to all frequencies, and not only at those frequencies that can produce resonant, standing-wave systems in the plate.

The velocity V for a given material is not significantly affected by the shape into which the material is formed. For instance, using the value of $b$ determined for flat plates 2 by the above method, a cone 61, such as is illustrated in Fig. 14, has been constructed which theoretically should radiate or receive sound, straight on, at 30 kilocycles per second. This cone 61 behaves as was predicted by the theory. In other words, the value of $b$, computed from the measurements of the said first-described method on the cone 61, checks with the value of $b$ obtained from measurements on plates 2 and discs 58.

As $V_0$, the velocity of sound in the medium, depends on the medium, it is obvious that the angle $\theta$ for any device is dependent upon the medium of propagation. A device which will work well at a given frequency in air, therefore, will not work at the same angle in water, where $V_0$ is much greater than in air. To make a device work under water at a chosen angle $\theta$, it is necessary to have a large value of V corresponding to the large value of $V_0$ in water. Now, since $$V = \sqrt{fbD}$$

it is obvious that V may be increased by working at a higher frequency, by finding a material in which $b$ is high, or by increasing the thickness D. For work under water, a plate has been constructed of aluminum, ½ inch thick, which receives 30 kilocycles sound at $\theta = 52$ degrees.

It is apparent from the equations already recited that an increase of the velocity of transmission of transverse vibration may be effected by an increase of the rigidity of the diaphragm. The most obvious method is to thicken the diaphragm, but various other methods are possible. The diaphragm, for instance, may be provided with corrugations 70 (Fig. 19), running in the direction of transmission of the vibration, or one or more fins 72 may be added at right angles to the diaphragm to stiffen it (Fig. 18).

I have found that a noise, as of a ship, an airplane propeller or exhaust, or escaping steam or air, has high frequency components of considerable intensity. Such a sound may be located as to direction by a device tuned, or selective as to frequency, with a sensitive range at 20, 30, 40 or 100 kilocycles, or any other value, so that the highly directive action of receivers such as the present receiver, operating at supersonic, or other high frequency, may be utilized in locating sound sources that are ordinarily explored by their audible pitches.

Other modifications will obviously occur to persons skilled in the art, and all such are considered to fall within the spirit and scope of the invention as defined in the appended claims.

What is claimed is:

1. A system for the interconversion of electric energy and the sound energy of a sound beam having a predetermined direction in a sound-conveying medium, the sound beam having a component of a given frequency, the said system comprising a continuous diaphragm vibratory in segments and disposed in the medium at an angle to the beam such that a transverse vibration propagated along the diaphragm has a velocity component, in the said predetermined direction, equal to the velocity of the beam in the medium, the number of such segments being determined by the said frequency, and characterized by a maximum of interconversion for the said angle.

2. A method of cumulatively interacting between a sound beam having a predetermined direction in a sound-conducting medium and a diaphragm mechanically coupled to the medium, that comprises propagating a transverse vibration along the diaphragm with a velocity having a component, in the said predetermined direction, equal to the velocity of the beam in the medium.

3. A method of cumulatively interacting between a sound beam having a predetermined direction in a sound-conducting medium and a diaphragm mechanically coupled to the medium, that comprises disposing the diaphragm at an angle to the sound beam such that the transverse vibration produced along the diaphragm by the sound beam shall have a component, in the said predetermined direction, of a velocity equal to the velocity of the beam in the medium.

4. A method of cumulatively interacting between a sound beam having a predetermined direction in a sound-conducting medium and a diaphragm mechanically coupled to the medium, that comprises disposing the diaphragm at an angle to the sound beam such that the transverse vibration produced along the diaphragm by high-frequency components of the sound beam shall have a component, in the said predetermined direction, of a velocity equal to the velocity of the beam in the medium.

5. A method of propagating a sound beam from a diaphragm in a medium to which the diaphragm is coupled that comprises exciting the diaphragm into periodic, transverse vibrations traveling along the diaphragm with a velocity having a component in the direction of the beam equal to the velocity of propagation of the beam in the medium.

6. A system for the directive discrimination of a sound beam having a predetermined direction in a sound-conducting medium comprising a continuous diaphragm vibratory in segments and disposed in the medium at an angle to the beam such that a transverse vibration propagated along the diaphragm has a velocity component, in the said predetermined direction, equal to the velocity of the beam in the medium, whereby cumulative interaction is produced between the vibrations of the segments and the vibrations of the beam, and an interconverter of vibrational and electrical energy associated with the diaphragm.

7. An electromechanical system comprising a transversely vibratory diaphragm angularly adjustable relative to a sound beam in a sound-conveying medium and characterized by a maximum amplitude of forced vibration when the approximate relation $$\sin \theta = \frac{V_0}{\sqrt{fbD}}$$

is fulfilled, in which relation, $\theta$ is the angle between the normal to the diaphragm and the direction of propagation of the beam, $V_0$ is the velocity of propagation of sound in the medium, $f$ is the frequency of the vibration, $D$ is the thickness of the diaphragm, and $b$ is a constant characteristic of the material of the diaphragm, means responsive to the vibrations of the diaphragm and selectively adjustable as to frequency, and means calibrated to accord with the said approximate relation whereby any one of the quantities $\theta$, $V_0$, $f$, $b$, and $D$ may be ascertained when the other said quantities are independently known.

8. A system for the directive discrimination of a sound beam comprising, in combination, a diaphragm vibratory transversely and of dimensions in the direction of propagation of transverse vibrations in the diaphragm large in comparison to the wavelength of said transverse vibrations, and disposable at an angle to the beam such as to produce cumulative interaction between the vibrations of the diaphragm and the vibrations of the beam, and an interconverter of electromagnetic and mechanical energy cooperative with a region of the diaphragm having a dimension in the direction of propagation of said transverse vibrations small in comparison with their wavelength, whereby vibrations of the diaphragm and current variations in the electric circuit are rendered interconvertible.

9. A diaphragm capable of being excited into transverse vibrations for receiving or producing sound in a medium by cumulative interaction between the transverse vibrations of the diaphragm and the vibrations of sound in the medium, the velocity of propagation of transverse vibrations in the diaphragm being augmented by corrugations of the diaphragm parallel to the direction of propagation of said transverse vibrations.

10. A diaphragm capable of being excited into transverse vibrations for receiving or producing sound in a medium by cumulative interaction between the transverse vibrations of the diaphragm and the vibrations of sound in the medium, the velocity of propagation of transverse vibrations in the diaphragm being augmented by ribs rigidly affixed to or integral with the diaphragm and acting to increase the rigidity of the diaphragm in the direction of propagation of said transverse vibrations.

11. A method of cumulatively interacting between a sound beam having a predetermined direction in a sound-conducting medium and a diaphragm mechanically coupled to the medium, that comprises propagating a periodical mechanical deformation along the diaphragm with a velocity having a component, in the said predetermined direction, equal to the velocity of the beam in the medium.

12. A method of cumulatively interacting between a sound beam in a sound-conducting medium and a continuous diaphragm transversely vibratory in segments, that comprises cophasing the vibrations of the sound in the medium with the vibration of particular segments of the diaphragm.

13. A method of cumulatively interacting between a sound beam having a direction of propagation in a sound-conducting medium and having a number of component frequencies that comprises coupling a transversely vibratory diaphragm to the medium and selecting a component frequency $f$ from the beam and an angle $\theta$ between the direction of the beam and the normal to the diaphragm, for which the approximate relation $$\sin \theta = \frac{V_0}{\sqrt{fbD}}$$

is fulfilled, where $\theta$ is the angle between the normal to the diaphragm and the direction of propagation of the beam, $V_0$ is the velocity of propagation of sound in the medium, $f$ is the frequency of the vibration, $D$ is the thickness of the diaphragm, and $b$ is a constant characteristic of the material of the diaphragm.

14. A method of cumulatively interacting between a sound beam having a predetermined direction in a sound-conducting medium and a diaphragm mechanically coupled to the medium, that comprises propagating a transverse vibration along the diaphragm with a velocity substantially greater than the velocity of propagation of sound in the medium and having a component, in the said predetermined direction, equal to the velocity of the beam in the medium.

15. A method of cumulatively interacting between a sound beam having a predetermined direction in a sound-conducting medium and a diaphragm mechanically coupled to the medium, that comprises disposing the diaphragm at an angle to the sound beam such that the transverse vibrations produced along the diaphragm by the sound beam shall have a component in the said predetermined direction, equal to the velocity of the beam in the medium, and determining the said angle.

16. A system for the directive discrimination of a sound beam having a predetermined direction in a sound-conducting medium comprising a diaphragm transversely vibratory, the diaphragm being disposable in the medium at an angle to the beam such that a transverse vibration propagated along the diaphragm has a velocity component, in the said predetermined direction, equal to the velocity of the beam in the medium, whereby cumulative interaction is produced between the vibrations of the diaphragm and the vibrations of the beam.

17. A system for the directive discrimination of a sound beam having a predetermined direction in a sound-conducting medium comprising a diaphragm transversely vibratory, having a velocity of propagation of transverse-wave vibration dependent upon the frequency of vibration and having a dimension in the direction of propagation of said transverse waves large in comparison with the wavelength of said transverse vibration, said vibration being excited by said sound beam, and said diaphragm being disposable in the medium at an angle to the beam such as to produce cumulative interaction between the beam in the medium and the vibration in the diaphragm.

18. A system for the directive discrimination of a sound beam having a predetermined direction in a sound-conducting medium comprising a diaphragm transversely vibratory, having a velocity of propagation of transverse-wave vibration dependent upon the frequency of vibration and having a dimension in the direction of propagation of said transverse waves large in comparison with the wavelength of said transverse vibration, the said diaphragm being disposable in the medium at an angle to the beam such as to produce cumulative interaction between the beam in the medium and the vibration in the diaphragm, and means for vibrating the diaphragm.

19. A system for the directive discrimination of a sound beam having a predetermined direction in a sound-conducting medium comprising a diaphragm vibratory in segments and disposed in the medium at an angle to the beam such that a transverse vibration propagated along the diaphragm has a velocity component, in the said predetermined direction, equal to the velocity of the beam in the medium, whereby cumulative interaction is produced between the vibrations of the segments and the vibrations of the beam.

20. A system for the directive discrimination of a sound beam having a predetermined direction in a sound-conducting medium comprising a diaphragm vibratory in segments and disposed in the medium at an angle to the beam such that a transverse vibration propagated along the diaphragm has a velocity component, in the said predetermined direction, equal to the velocity of the beam in the medium, and means for vibrating the diaphragm in the said segments to produce cumulative interaction between the vibrations of the segments and the vibrations of the beam.

21. A system for the directive discrimination of a sound beam having a predetermined direction in a sound-conducting medium comprising a diaphragm vibratory in segments and disposed in the medium at an angle to the beam such that a transverse vibration propagated along the diaphragm has a velocity component, in the said predetermined direction, equal to the velocity of the beam in the medium, whereby cumulative interaction is produced between the vibrations of the segments and the vibrations of the beam, and means for determining the direction of the sound beam.

22. A system for the directive discrimination of a sound beam having a predetermined direction in a sound-conducting medium comprising a diaphragm vibratory in a definite number of segments for a definite direction, the diaphragm being disposed in the medium at an angle to the beam such that a transverse vibration propagated along the diaphragm has a velocity component, in the said predetermined direction, equal to the velocity of the beam in the medium, whereby cumulative interaction is produced between the vibrations of the segments and the vibrations of the beam in the said direction.

23. A system for the directive discrimination of a sound beam having a predetermined direction in a sound-conducting medium comprising a substantially uniformly loaded diaphragm transversely vibratory in segments and disposable in the medium at an angle to the beam such that a transverse vibration propagated along the diaphragm has a velocity component, in the said predetermined direction, equal to the velocity of the beam in the medium, whereby cumulative interaction is produced between the vibrations of the segments and the vibrations of the beam.

24. A system for the directive discrimination of a sound beam having a predetermined direction in a sound-conducting medium comprising a diaphragm transversely vibratory in segments and disposable in the medium at an angle to the beam such that a transverse vibration propagated along the diaphragm has a velocity component, in the said predetermined direction, equal to the velocity of the beam in the medium, whereby cumulative interaction is produced between the vibrations of the segments and the vibrations of the beam, and a vibrator affixed intermediately of the diaphragm to one of the segments for vibrating the diaphragm or for converting the vibrations of the diaphragm into electric energy.

25. A system for the directive discrimination of a sound beam having a predetermined direction in a sound-conducting medium comprising a dihedral diaphragm having continuous, transversely vibrating wings each angularly disposable in the medium at an angle to the beam such that, when the wings are so disposed, a transverse vibration propagated along each wing has a velocity component, in the said predetermined direction, substantially equal to the velocity of the beam in the medium, whereby cumulative interaction is produced between the transverse vibrations of the wings and the vibrations of the beam, and an interconverter of vibrational and electrical energy associated with the diaphragm.

26. A system for the directive discrimination of a sound beam having a predetermined direction in a sound-conducting medium comprising a cone diaphragm disposable in the medium with substantially zero angle between the axis of the cone and the said predetermined direction, said cone diaphragm having a half angle such that, when the diaphragm is so disposed, transverse vibrations propagated in the cone diaphragm have a velocity component, in the said predetermined direction, substantially equal to the velocity of the beam in the medium, whereby cumulative interaction is produced between the transverse vibrations of the cone and the vibrations of the beam, and an interconverter of vibrational and electrical energy associated with the diaphragm.

27. A system for the directive discrimination of a sound beam in a medium comprising a transversely vibratory diaphragm disposable in the medium at an angle $\theta$ with a line at right angles to the direction of the beam, such that $$\sin \theta = \frac{V_0}{V}$$

where $V_0$ is the velocity of the sound in the medium, and $V$ is the velocity of propagation of elastic waves in the material of the diaphragm, and an interconverter of vibrational and electrical energy associated with the diaphragm.

GEORGE W. PIERCE.